(12) United States Patent
Bunch et al.

(10) Patent No.: US 10,191,152 B2
(45) Date of Patent: Jan. 29, 2019

(54) LOW-COST LIGHTWEIGHT INTEGRATED ANTENNA FOR AIRBORNE WEATHER RADAR

(71) Applicant: Honeywell International Inc., Morris Plains, NJ (US)

(72) Inventors: Brian P. Bunch, Snohomish, WA (US); David C. Vacanti, Renton, WA (US); Robert J. Jensen, Renton, WA (US); Steve Mowry, Duvall, WA (US)

(73) Assignee: Honeywell International Inc., Morris Plains, NJ (US)

( * ) Notice: Subject to any disclaimer, the term of this patent is extended or adjusted under 35 U.S.C. 154(b) by 229 days.

(21) Appl. No.: 15/223,380

(22) Filed: Jul. 29, 2016

(65) Prior Publication Data

US 2018/0031699 A1    Feb. 1, 2018

(51) Int. Cl.
| | | |
|---|---|---|
| *G01S 13/95* | (2006.01) | |
| *H01Q 21/00* | (2006.01) | |
| *H01Q 3/08* | (2006.01) | |
| *H01Q 1/28* | (2006.01) | |
| *G01S 7/04* | (2006.01) | |
| *H01Q 1/38* | (2006.01) | |

(Continued)

(52) U.S. Cl.
CPC .............. *G01S 13/953* (2013.01); *G01S 7/03* (2013.01); *G01S 7/04* (2013.01); *H01Q 1/28* (2013.01); *H01Q 1/281* (2013.01); *H01Q 1/38* (2013.01); *H01Q 1/40* (2013.01); *H01Q 3/06* (2013.01); *H01Q 3/08* (2013.01); *H01Q 21/005* (2013.01); *H01Q 21/0043* (2013.01)

(58) Field of Classification Search
CPC .. H01Q 1/28; H01Q 1/40; H01Q 3/08; H01Q 13/00; H01Q 21/0043; H01Q 21/005; G01S 13/95; G01S 13/951; G01S 13/953; G01S 13/955; G01S 13/956; G01S 13/958

See application file for complete search history.

(56) References Cited

U.S. PATENT DOCUMENTS 4,266,228 A * 5/1981 Perrotti ................ H01Q 25/001
                                                        343/767
4,450,449 A    5/1984 Jewitt
(Continued)

FOREIGN PATENT DOCUMENTS

CN        203134965 U     8/2013
WO     2005107014 A1    11/2005

OTHER PUBLICATIONS

Response to Extended European Search Report dated Nov. 30, 2017, from counterpart European Patent Application No. 17181081.5, filed on Apr. 9, 2018, 15 pp.

(Continued)

*Primary Examiner* — Peter M Bythrow
(74) *Attorney, Agent, or Firm* — Shumaker & Sieffert, P.A.

(57) ABSTRACT

A weather radar with an integrated flat plate slotted array antenna system mounted to a motorized, gimbaled platform. The integrated antenna system includes a substrate integrated waveguide (SIW) receiver/transmitter antenna integrated with other printed circuit board (PCB) layers. The PCB includes radar transmitter, receiver and processing circuits configured to communicate with weather radar display and controller units. A protective shield provides radio-frequency (RF) shielding and mechanical support for the integrated antenna system.

8 Claims, 2 Drawing Sheets

(51) Int. Cl.
*H01Q 1/40* (2006.01)
*G01S 7/03* (2006.01)
*H01Q 3/06* (2006.01)

(56) References Cited

U.S. PATENT DOCUMENTS

| | | | | |
|---|---|---|---|---|
| 4,916,458 | A * | 4/1990 | Goto | H01Q 21/005 343/770 |
| 5,579,019 | A * | 11/1996 | Uematsu | H01Q 21/005 343/770 |
| 5,648,786 | A | 7/1997 | Chung et al. | |
| 6,377,204 | B1 * | 4/2002 | Wurman | G01S 13/003 342/59 |
| 6,731,241 | B2 * | 5/2004 | Park | H01Q 21/0006 342/361 |
| 6,946,996 | B2 | 9/2005 | Koyama | |
| 6,972,727 | B1 * | 12/2005 | West | H01P 1/181 333/157 |
| 6,989,791 | B2 | 1/2006 | Navarro et al. | |
| 7,109,913 | B1 * | 9/2006 | Paramore | G01C 23/00 342/26 B |
| 7,808,439 | B2 * | 10/2010 | Yang | H01P 3/121 343/770 |
| 7,881,689 | B2 | 2/2011 | Leblanc et al. | |
| 8,009,112 | B2 | 8/2011 | Buer et al. | |
| 8,035,568 | B2 | 10/2011 | Diaz et al. | |
| 8,098,189 | B1 * | 1/2012 | Woodell | G01S 7/025 342/26 R |
| 8,427,371 | B2 | 4/2013 | Pozgay | |
| 8,981,906 | B2 | 3/2015 | Takeoka et al. | |
| 9,118,112 | B1 | 8/2015 | West et al. | |
| 9,130,278 | B2 | 9/2015 | Palevsky et al. | |
| 9,172,145 | B2 * | 10/2015 | Puzella | H01Q 21/0025 |
| 9,182,485 | B1 * | 11/2015 | Andrews | H01Q 3/30 |
| 9,297,896 | B1 * | 3/2016 | Andrews | H01Q 3/30 |
| 9,865,935 | B2 * | 1/2018 | Miraftab | H01Q 21/005 |
| 2008/0150832 | A1 | 6/2008 | Ingram | H01Q 3/26 343/893 |
| 2008/0246670 | A1 * | 10/2008 | Vlad | H01Q 1/28 343/705 |
| 2008/0248772 | A1 * | 10/2008 | Vlad | H01Q 1/286 455/269 |
| 2009/0066597 | A1 * | 3/2009 | Yang | H01P 3/121 343/771 |
| 2011/0175780 | A1 * | 7/2011 | Gatti | H01Q 13/22 343/766 |
| 2012/0092224 | A1 * | 4/2012 | Sauleau | H01Q 3/18 343/771 |
| 2012/0313823 | A1 | 12/2012 | Armstrong et al. | |
| 2013/0082801 | A1 * | 4/2013 | Rofougaran | H01L 23/5222 333/239 |
| 2013/0300602 | A1 * | 11/2013 | Zhou | H01Q 3/247 342/372 |
| 2014/0097995 | A1 | 4/2014 | McKinzie, III | |
| 2015/0234035 | A1 | 8/2015 | Loheofener et al. | |
| 2015/0318621 | A1 | 11/2015 | Apostolos et al. | |
| 2016/0204514 | A1 * | 7/2016 | Miraftab | H01Q 21/005 343/737 |
| 2017/0047658 | A1 * | 2/2017 | Ying | H01Q 1/521 |
| 2017/0207545 | A1 * | 7/2017 | Miraftab | H01Q 21/0075 |
| 2017/0285137 | A1 * | 10/2017 | West | G01S 7/282 |

OTHER PUBLICATIONS

Extended Search Report from counterpart European Application No. 17181081.5, dated Nov. 30, 2017, 8 pp.
Latto, "Satellites and 3D Radar will Drive the Aviation Evolution," Connector and Cable Assembly Supplier, NextGEN, retrieved from http://www.connectorsupplier.com/satellites-and-3d-radar-will-drive-theaviation-evolution/, Oct. 6, 2014, 3 pp.
Schaubert, Proceedings of the 2009 Antenna Applications Symposium, vol. II, AFRL-RY-TR-2010-0001, Air Force Research Laboratory, Dec. 12, 2009, 260 pp.
Teshiba et al., "Application of a Monopulse Array System to Weather Observations for Detecting Wind Shear at Sub-Beamwidth Resolution," CiteSeer, National Science Foundation, 24 Conference on IIPS, Jan. 24, 2008 4 pp.
Knosp, "The All-Metal Patch Array, Science and Technology," Science and Technology, Jet Propulsion, Aug. 3, 2009, 8 pp.
Torruella, "Next Generation Technology Signals the Future of Antenna Innovation," Next Generation Technology Signals the Future of Antenna Innovation, Jul. 10, 2015, 17 pp.
Bendix/King "Pilot's Guide Digital Weather Radar System," RDR 2100, Honeywell, retrieved from http://www.bendixking.com/products/safety/weather/RDR-2100 on Jun. 16, 2016, 74 pp.
"Honeywell Weather Radar", Weather Radar RT, Duncan Aviation Inc., retrieved from https://myduncan.aero/online/parts/details/7021450-601, Jun. 16, 2016, 4 pp.
"RDR 2100, Digital Weather Radar", Overview, Honeywell International, retrieved from http://www.bendixking.com/products/safety/weather/rdr-2100, Jun. 16, 2016, 3 pp.
"Southeast Aerospace," Product Information Page, Honeywell WU-660, retrieved from http://www.seaerospace.com/sperry/wu660.htm Jun. 16, 2016, 2 pp.
"Reliable Weather Avoidance Radar," Primus 880 Weather Radar, Honeywell, Oct. 2005, 6 pp.

* cited by examiner

LOW-COST LIGHTWEIGHT INTEGRATED ANTENNA FOR AIRBORNE WEATHER RADAR

TECHNICAL FIELD

The disclosure relates to airborne weather radar.

BACKGROUND

Airborne weather radar system may use a flat plate antenna mounted on a motorized, gimbaled mechanism installed in behind a radome in the nose of an aircraft. A flat plate antenna for weather radar may be a slotted array waveguide antennae constructed from aluminum. An aluminum slotted array waveguide antenna may have advantages because of low insertion loss, and good transmit and receive performance. Aluminum slotted array waveguide antennae have some disadvantages, which may include weight and high cost. Some of the high cost comes from the difficulty in manufacturing aluminum slotted array waveguide antennae because of multiple process steps, expensive braising techniques and a tendency to suffer from process variation. Small deviations in dimensions and positions of slots and other features may impact transmission and receiving performance. A weather radar system using an aluminum slotted array waveguide antennae may also require radar transmission and receive components mounted near the antenna, but not necessarily on the movable portion of the motorized mechanism. The system may also require waveguides to conduct the radio-frequency (RF) energy to and from the antenna. These waveguides may also be of aluminum or similar material, and built to very precise dimensions for proper RF performance. The material and precision manufacturing may also contribute to the weight and high cost of such a weather radar system. Costly and heavy weather radar systems may preclude their use on smaller aircraft.

SUMMARY

In general, the disclosure is directed to various techniques related to low-cost, lightweight airborne weather radar systems and antennas for use in such weather radar systems. In some implementations, the weather radar system, including both the antennas and associated electronics, may be implemented into an integrated package mounted on a motorized, gimbaled mounting unit. The integrated package may include circuits and components that implement radar transmit electronics, radar receive electronics as well one or more processors to control the system and power conditioning and distribution circuitry to support the weather radar system operation.

In one example, the disclosure is directed to a weather radar system comprising an integrated radar antenna, the integrated radar antenna comprising: a slotted array waveguide antenna, wherein the slotted array waveguide antenna is a substrate integrated waveguide (SIW) antenna, radar transmitter electronics in signal communication with the slotted array waveguide antenna and the one or more processors, wherein the radar transmit electronics, in conjunction with the slotted array waveguide antenna, are configured to output radar signals, radar receiver electronics in signal communication with the slotted array waveguide antenna and the processor, wherein the radar receiver electronics are configured to receive from the slotted array waveguide antenna radar reflections corresponding to the outputted radar signals.

The details of one or more examples of the disclosure are set forth in the accompanying drawings and the description below. Other features, objects, and advantages of the disclosure will be apparent from the description and drawings, and from the claims.

DETAILED DESCRIPTION

This disclosure describes various techniques related to low-cost, lightweight airborne weather radar systems and antennas for use in such weather radar systems. In some implementations, the weather radar system, including both the antennas and associated electronics, may be implemented into an integrated package mounted on a motorized, gimbaled mounting unit. The airborne weather radar system may include a multi-layer printed circuit board that includes a substrate integrated waveguide (SIW) antenna layer and one or more circuit layers. The multi-layer printed circuit board may include circuits and components that implement radar transmit electronics, radar receive electronics as well as one or more processors to control the system and power conditioning and distribution circuitry to support the weather radar system operation. Aircraft may use an airborne weather radar system to detect and avoid turbulence, icing conditions, thunderstorms and other weather that may pose a hazard to the aircraft.

An integrated airborne weather radar system that includes an SIW antenna and electronic components may have several advantages. Some advantages include, SIW makes the waveguide very thin and light, which may benefit many mechanically steered antennas, such as a weather radar system, because of its lower weight and relatively small moment of inertia. An SIW antenna array is a printed circuit board version of a slotted array waveguide antenna. An SIW antenna may have advantages over other types of slotted waveguide antennae, such as a slotted waveguide antennae constructed from aluminum. For example, the substrate filled in SIW structure makes it is possible to put more slots in one branch, thereby the SIW antenna array is able to offer a tight, narrow beam-width that is beneficial to many applications. Additionally, the SIW structure may allow a smaller volume antenna with comparable performance to a larger slotted array waveguide antenna made from aluminum. Using printed wiring board (PWB) techniques and processes for the SIW structure are much easier to control and suffer from less unit-to-unit variation. PWB may also be called a printed circuit board (PCB). PWB techniques and processes may improve performance, reliability as well as lowering costs. An integrated package on a multi-layer circuit board may, in some examples, reduce the need for other radar electronics, and waveguides, mounted near the antenna, but not necessarily on the movable portion of the motorized mechanism. A smaller, lighter antenna may also lead to a smaller, lighter motorized mechanism. The entire weather radar system may be small enough and light weight enough to be installed on smaller aircraft, which may improve flight safety for those smaller aircraft. An integrated radar system, in accordance with this disclosure, may also minimize complexity and difficult manufacturing utilized by microstrip patch array antennae or printed patch array antennae.

Figure 1:
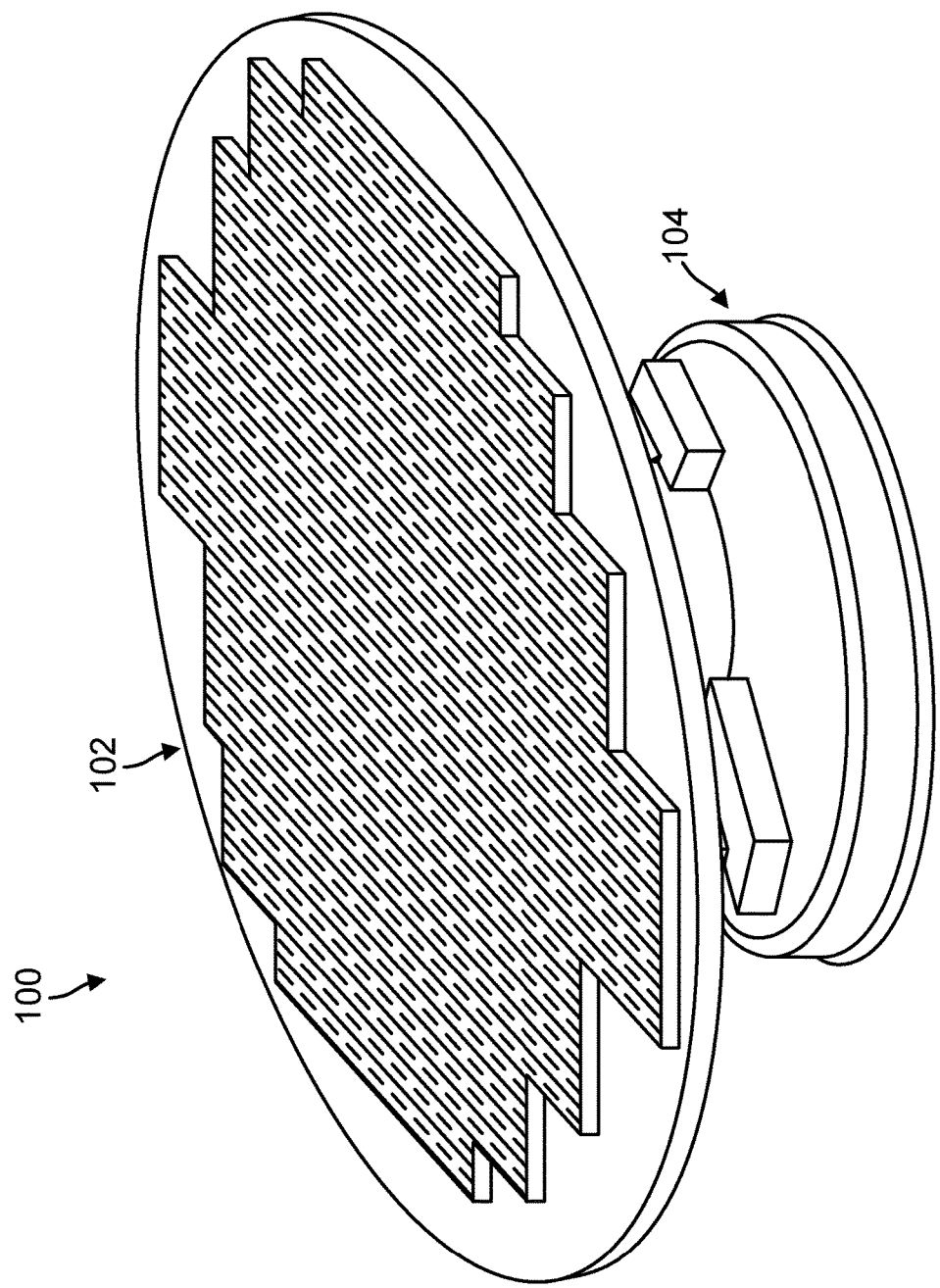
FIG. 1 is a conceptual diagram illustrating an example weather radar system with an SIW antenna array in accordance with one or more techniques of this disclosure.

FIG. 1 is a conceptual diagram illustrating an example weather radar system with an SIW antenna array in accordance with one or more techniques of this disclosure. FIG. 1 illustrates example weather radar system 100, which includes integrated radar antenna system 102 and gimbaled mount 104.

Weather radar system 100, as depicted in FIG. 1, includes the radar antenna and the motorized, gimbaled mount used to aim the antenna. Weather radar system 100 may be a component of a larger weather radar system that includes a weather display, controller circuits, user input controls and power supply. In some examples weather radar system 100 may mount on the nose of an aircraft protected by a radome. Weather radar system 100 may also mount in other locations on an aircraft, such as a wing pod or other location. Weather radar system 100 may aim the antenna, adjust radar transmission power, define a radar scanning pattern and modify other parameters in response to user commands or other commands from the other components in the larger weather radar system. Weather radar system 100 may automatically manage antenna tilt angles, such as during aircraft maneuvers, including climbing, descends and turns. During ground operations, weather radar system 100 may be configured to detect objects that may pose a hazard to an aircraft, such as other aircraft, buildings, and ground vehicles. Airborne weather radar systems may be required to perform in harsh environments. Some examples include withstanding repeated shock of landing, reliable performance during turbulence, and possible exposure to moisture, heat, and cold.

Integrated radar antenna system 102 may perform the functions both of a flat plate radar antenna and include the radar and other electronics. A "flat plate" antennas, may be considered an array of slot elemental antennas. Each slot acts approximately as a dipole antenna, wherein the radar system and dimensions of the antenna control the relative phasing of each element to provide an overall beam pattern. "Flat-plate" antennas may also be called: flat-plate radiators, flat-plate array, slotted array radiator, or planar array. Flat plate antennae may also be referred to as phased-arrays because the static relative phasing of the elements in the array controls the beam shape. However, unlike some "phase-array" radars that electrically steer the transmission beam by dynamic phasing of the elements in the array, weather radar system 100 mechanically steers the beam by aiming integrated radar antenna system 102 in the desired directions and scanning patterns. However the use of an SIW antenna may also allow the option to include electronic scanning in one plane or implementation of two or more sub-arrays that may permit difference patterns or other functions. This additional flexibility is made possible by the direct integration of the SIW antenna elements and the electronics of the radar system.

Integrated radar antenna system 102 may include a combined transmit and receiver SIW antenna, as well as circuits and components that implement radar transmit electronics, radar receive electronics, one or more processors, communication electronics, power conditioning and distribution, clock/timers and other circuitry and components. Integrating radar transmission and receiver with an SIW antenna, integrated radar antenna system 102 may create advantages over other types of weather radar systems. Some advantages include, SIW makes the waveguide very thin and light, it benefits many mechanically steered antennas with a lower weight and relatively small moment of inertia. An SIW antenna is a printed circuit board version of a slotted waveguide antenna. An SIW antenna may have advantages over other types of slotted waveguide antennae, such as a slotted waveguide antennae constructed from aluminum. For example, the substrate filled SIW structure makes it is possible to put more slots in one branch, thereby the SIW antenna array is able to offer a tight, narrow beam-width with fewer sidelobes that is beneficial to many applications.

Gimbaled mount 104 may be similar to a receiver transmitter assembly (RTA), such as an RTA used for a flat plate aluminum antenna. Similar to an RTA, gimbaled mount 104 may receive antenna positioning commands from integrated antenna system 102, or from a controller or other component of the larger weather radar system. For example, a manual user input may direct weather radar system 100 to focus on a certain region of an approaching thunderstorm. Gimbaled mount 104 may aim integrated antenna system 102 at the certain region of the thunderstorm as directed. In some examples, gimbaled mount 104 may begin a focused scan pattern of the region in response to either commands from a controller or from internal processing within gimbaled mount 104.

Gimbaled mount 104 may have advantages in cost, weight and complexity over an RTA because an RTA used for a flat plate aluminum antenna may include radar receiver electronics, radar transmitter electronics including a high voltage magnetron as well as high precision waveguides to conduct the transmitted RF energy to the flat plate aluminum antenna and the received return signals from the antenna. In contrast, gimbaled mount 104 used for integrated radar system 102 may have similar antenna angle control motors, motor control and power circuits and some connections to communicate with integrated antenna system 102. However gimbaled mount 104 may not include radar receiver or transmitter electronics, as the receiver and transmitter electronics may be contained within integrated antenna system 102. Additionally, integrated radar system 102 may have less mass and moment of inertia compared to a flat plate aluminum antenna. Therefore, gimbaled mount 104 may utilize lighter weight support structure and antenna aim and control structure than that used by an RTA.

Figure 2:
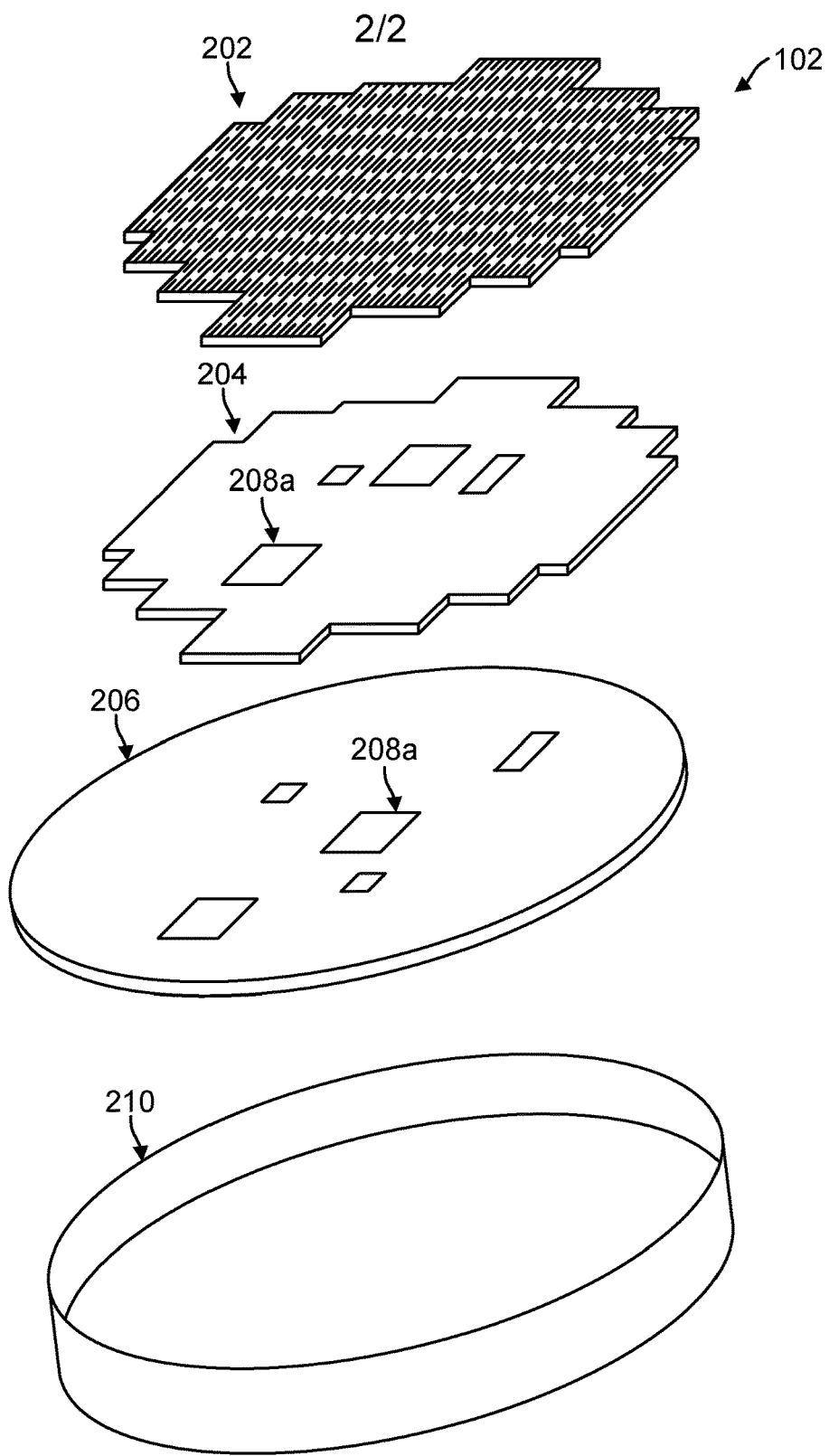
FIG. 2 is a conceptual diagram illustrating an exploded view of example integrated antenna system in accordance with one or more techniques of this disclosure.

FIG. 2 is a conceptual diagram illustrating an exploded view of example integrated antenna system in accordance with one or more techniques of this disclosure. Integrated antenna system 102 may attach to a motorized, gimbaled mount, such as gimbaled mount 104 shown in FIG. 1.

Integrated antenna system 102 may include one or more multi-layer printed circuit boards (PCB) that includes one or more SIW antenna layers 202, one or more ground layers, one or more circuit signal path layers and one or more circuit layers with components, 204 and 206. The term printed wiring board (PWB) may be used interchangeably with PCB in this disclosure. Integrated antenna system 102 may also include a protective shield 210.

SIW antenna layer 202 may be constructed of copper clad PCB for an upper and lower waveguide surface, with the dielectric of the PCB for the waveguide volume and plated vias (aka holes) for the waveguide walls. In other words, SIW is a transmission line that creates a waveguide within a substrate. Its waveguide consists of two lines of holes as the two opposite side walls of a rectangular waveguide and the metallic layer on the top and bottom to form a rectangular cavity. The outer copper clad PCB layer may be a radiating slot layer that includes rows of slots that penetrate the copper to the substrate beneath. The dimensions and relative location of these slots may depend on the radar frequency and may determine the shape of the transmitted beam. SIW antenna layer 202 may both transmit radar RF energy through these slots and receive the reflected RF energy through these slots. SIW antenna layer 202 may be divided into zones, for example an inner radiating area and an outer radiating area.

The rectangular waveguide structure beneath each row of radiating slots may include feed slots that couple the RF energy from the radar transmitter electronics to the rectangular waveguides and further to the radiating slots. The same feed slots may couple the reflected RF energy received by SIW antenna layer 202 to the radar receiver electronics. Each rectangular waveguide structure may also include a terminal edge at each end to contain the RF energy. The terminal edge may be electrically connected to ground.

The multi-layer printed circuit board may include circuit layers 204 and 206 containing circuits and components that implement radar transmitter electronics, radar receiver electronics, one or more processors 208A and 208B, communication electronics, power conditioning and distribution, clock/timers and other circuitry and components. Radar receiver electronics may include a homodyne receiver to directly convert RF signals to a baseband frequency. The one or more processors 208A and 208B may be configured to control the radar transmit electronics and radar receive electronics as well as process and identify radar targets and send notifications and information to the weather radar display. One or more processors 208A and 208B may include any one or more of a microprocessor, a controller, a digital signal processor (DSP), an application specific integrated circuit (ASIC), a field-programmable gate array (FPGA), a system on chip (SoC) or equivalent discrete or integrated logic circuitry. A processor may be integrated circuitry, i.e., integrated processing circuitry, and that the integrated processing circuitry may be realized as fixed hardware processing circuitry, programmable processing circuitry and/or a combination of both fixed and programmable processing circuitry. Circuit layers 204 and 206 may include one or more ground layers, power supply layers, as well as spacing, shielding traces and other features required for RF circuit design.

The SIW antenna layer 202 may be electrically connected to circuit paths and components on one or more circuit layers 204 and 206. In some examples, plated vias may provide connections between one or more circuit layers 204 and 206, as well as to SIW antenna layer 102. A via may be a plated or unplated hole that may be drilled, etched or otherwise formed between layers of the multi-layer PCB. A plated via may be plated with a conductive material to electrically connect layers. Some examples of conductive material may include copper, solder, conductive epoxy or other materials. SIW antenna layer 202 may also include one or more transitions to connect the waveguide to the one or more circuit layers 204 and 206.

An SIW waveguide suffers higher insert loss than aluminum waveguide caused by (a) the substrate dielectric loss tangent and, (b) the surface roughness between metallic layer and the substrate. SIW antenna layer 202 may have a lower antenna gain when compared to an aluminum flat plate antenna because of dielectric loss. In other words the energy loss associated with the particular dielectric material. To overcome a lower antenna gain may require higher power radar transmitter. In some examples, solid state radar transmitter components, such as X-band solid state radar transmitter technology, may have advantages over the radar transmitter components in an RTA. Some solid state radar transmitter components may be more economical, even at higher power ratings, and may represent a net cost savings.

Protective shield 210 may cover and provide structural support and protection for integrated radar antenna 102, which may include protection from moisture or other contaminants. Protective shield 210 may be a molded plastic, stamped or formed sheet metal or other suitable material. Protective shield 210 may include a conductive coating in one or more areas to provide shielding for electromagnetic interference (EMI) as well as RF isolation and impedance control. Protective shield 210 may include penetrations for power, communication or other connections as well as be configured to securely mount gimbaled mount 104. Protective shield 210 may include one or more mechanical stiffener structures for additional strength. Protective shield 210 may provide added strength as well as other multiple functions, such as EMI shielding, heat dissipation (heat sink) in addition to adding structural integrity under vibration and shock.

Various examples of the disclosure have been described. These and other examples are within the scope of the following claims.

The invention claimed is:

1. A weather radar system comprising an integrated radar antenna, the integrated radar antenna comprising a multi-layer circuit board comprising:
   a slotted array waveguide antenna, wherein the slotted array waveguide antenna comprises a substrate integrated waveguide (SIW) antenna;
   radar transmitter electronics in signal communication with the slotted array waveguide antenna, wherein the radar transmit electronics, in conjunction with the slotted array waveguide antenna, are configured to output radar signals;
   radar receiver electronics in signal communication with the slotted array waveguide antenna, wherein the radar receiver electronics are configured to receive from the slotted array waveguide antenna radar reflections corresponding to the outputted radar signals.

2. The weather radar system of claim 1, further comprising a protective shield, wherein the protective shield is configured to support, protect and provide an electromagnetic interference (EMI) shield for the integrated radar antenna.

3. The weather radar system of claim 2, further comprising a gimbaled mount, wherein the gimbaled mount is configured to:
   support the integrated radar antenna;
   receive an antenna position signal;
   aim the integrated radar antenna in response to the antenna position signal.

4. The weather radar system of claim 3, further comprising one or more processors configured to:
   determine an aim direction for the integrated radar antenna at a first time;
   send the antenna position signal to the gimbaled mount.

5. The weather radar system of claim 1, wherein the weather radar system is configured to mount to an aircraft.

6. The weather radar system of claim 1, wherein the weather radar system is configured to send weather information to a weather display device.

7. The weather radar system of claim 1, wherein the multi-layer circuit board comprises at least one layer to provide mechanical strength.

8. The weather radar system of claim 1, wherein the integrated radar antenna further comprises one or more processors.

* * * * *